(12) United States Patent
Schuurmans

(10) Patent No.: US 7,152,986 B2
(45) Date of Patent: Dec. 26, 2006

(54) MODULAR PIVOT ARRANGEMENT

(75) Inventor: Maarten J. Schuurmans, Kingswood (AU)

(73) Assignee: Schefenacker Vision Systems Australia Pty Ltd, Lonsdale (AU)

( * ) Notice: Subject to any disclaimer, the term of this patent is extended or adjusted under 35 U.S.C. 154(b) by 101 days.

(21) Appl. No.: 10/505,193

(22) PCT Filed: Feb. 19, 2003

(86) PCT No.: PCT/AU03/00204

§ 371 (c)(1), (2), (4) Date: Aug. 19, 2004

(87) PCT Pub. No.: WO03/070518

PCT Pub. Date: Aug. 28, 2003

(65) Prior Publication Data

US 2005/0146802 A1 Jul. 7, 2005

(30) Foreign Application Priority Data

Feb. 20, 2002 (AU) .................... PS0628

(51) Int. Cl.
*G02B 7/182* (2006.01)

(52) U.S. Cl. ............... 359/879; 248/479
(58) Field of Classification Search ........ 359/871, 359/872, 877, 879; 248/479

See application file for complete search history.

(56) References Cited

U.S. PATENT DOCUMENTS

| 5,432,640 | A | * | 7/1995 | Gilbert et al. | 359/872 |
| 6,022,113 | A | * | 2/2000 | Stolpe et al. | 359/877 |
| 6,322,221 | B1 | * | 11/2001 | van de Loo | 359/877 |
| 6,390,630 | B1 | | 5/2002 | Ochs | |

* cited by examiner

Primary Examiner—Euncha P. Cherry
(74) Attorney, Agent, or Firm—Warn, Hoffmann, Miller & LaLone, P.C.

(57) ABSTRACT

A pivot assembly (10) adapted to connect a mirror head (11) and a mirror mounting bracket (12) of a rear vision mirror assembly. The pivot assembly (10) has a spigot extending from a spigot plate (40), a plate (35) journalled to the spigot and a detent arrangement between the plate (35) and spigot. An attachment arrangement on both the spigot plate (40) and plate (35) allows the spigot plate (40) to be secured to either one of the mirror head (11) or the mirror mounting bracket (12). The attachment arrangement also allows the plate (35) to be secured to the other of the mirror head (11) or the mirror mounting bracket (12). A stop means associated with the spigot and adapted to engage with a stop arrangement on either the mirror head (11) or the mirror mounting bracket (12) limits rotation of the mirror head (11) with respect to the mirror mounting bracket (12).

29 Claims, 8 Drawing Sheets

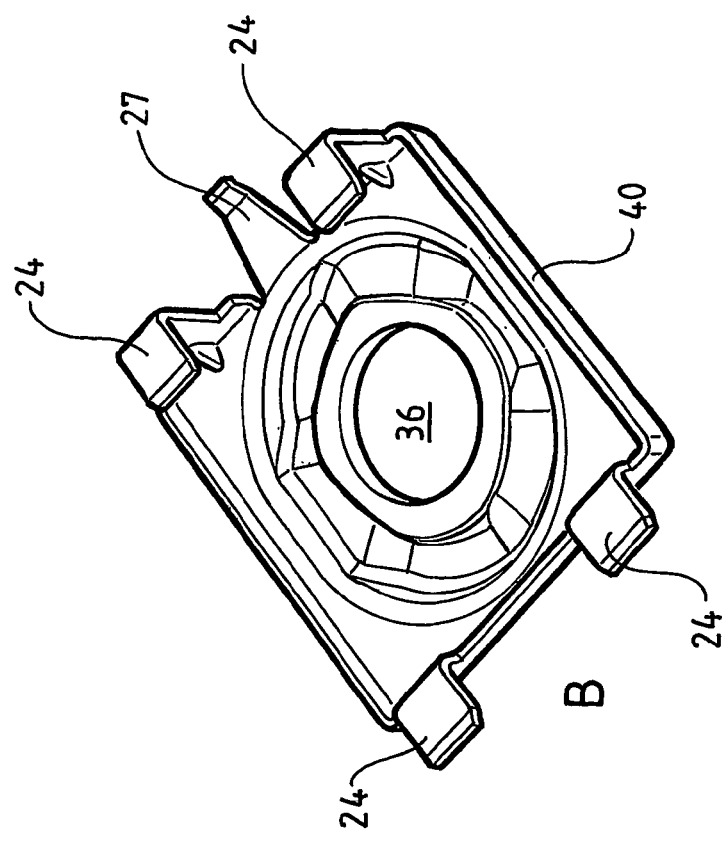
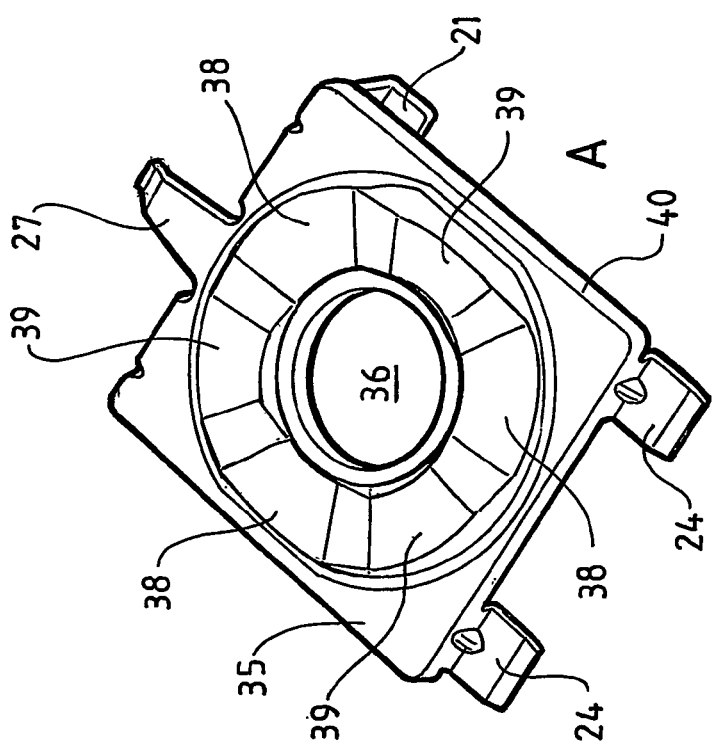
Fig 3

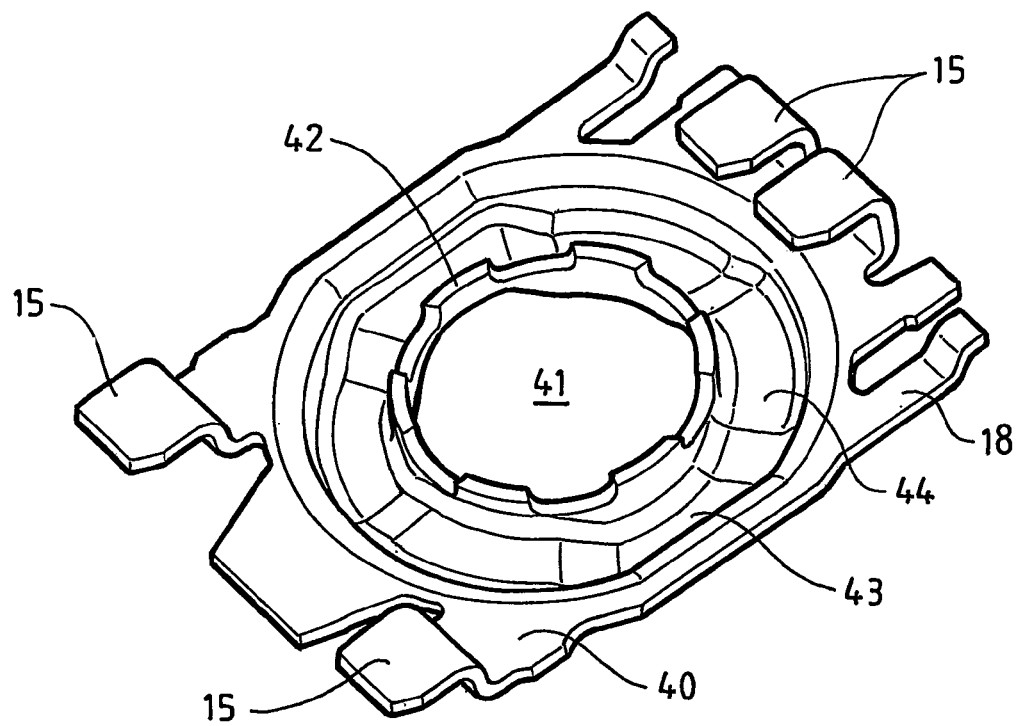
Fig 4
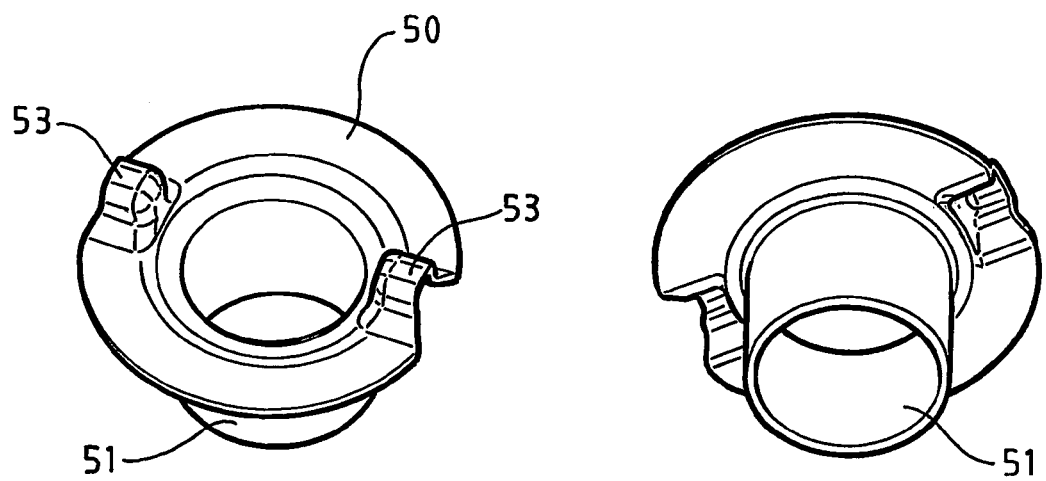
Fig 5 Fig 6

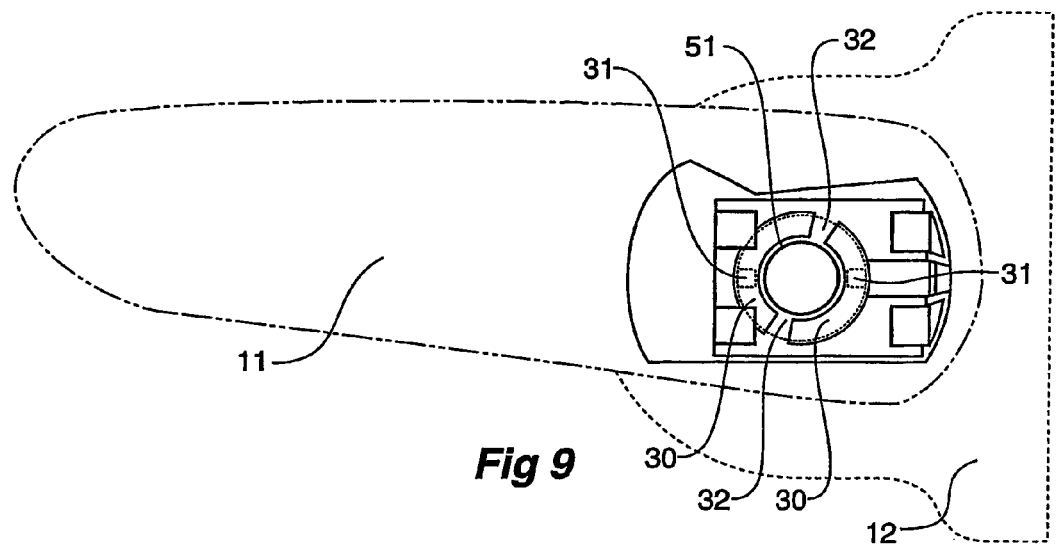
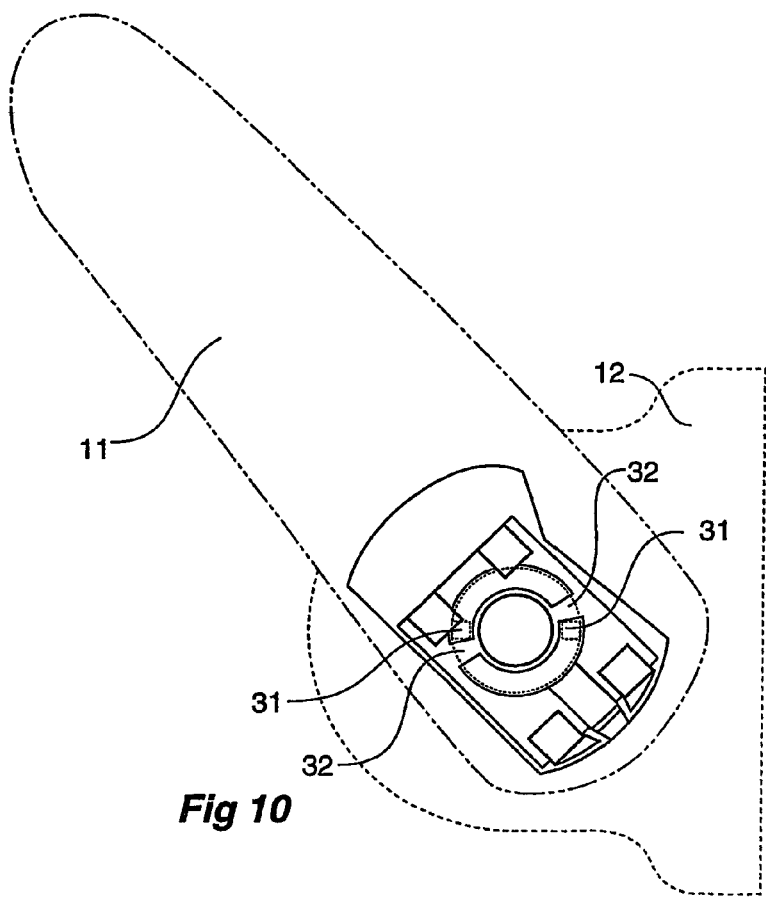

MODULAR PIVOT ARRANGEMENT

CROSS-REFERENCE TO RELATED APPLICATIONS

This application is a National Stage of International Application No. PCT/AU03/00204, filed Feb. 19, 2003; which claims priority to Australian Patent Application No. PS0628 filed on Feb. 20, 2002. The disclosures of the above applications are incorporated herein by reference.

FIELD OF THE INVENTION

This invention relates to a pivot assembly incorporating a detent that is used to connect a mirror head and mirror mounting bracket of a rear vision mirror. In particular, it relates to a pivot assembly having attachment means which enables it to be secured between a mirror head and mirror mounting bracket.

BACKGROUND OF THE INVENTION

Vehicle mirrors, in particularly external side rear view mirrors normally comprise a mirror head which is pivotally attached to a mounting bracket. The mounting bracket is in turn secured to the motor vehicle body. The pivot enables the mirror head to rotate with respect to the bracket to either allow movement of the mirror head if it is impacted either while the vehicle is moving or stationary (referred to as "mirror break away") or to move to a parked position under the action of drive means incorporate the mirror head to ensure that the mirror head is moved to position where it is as close to the vehicle body as possible.

A detent is normally used in the pivot. This provides a positive location and holding force for the mirror in various positions as it is rotated about the pivot. The detents resist initial movement of the pivot and require a minimum force in order to overcome the detent force.

Such detents are common practice in the field, and normally comprise either circular balls held between a surface of the mirror head and mounting bracket which locate within recesses or abutting ramped surfaces. The holding force is provided by a spring which is normally a coil spring located around a vertical spigot. The spigot is normally incorporated into the mounting bracket and the mirror head has an aperture which locates over the spigot. One disadvantage of this is the fact that the spigot on the bracket and the aperture within the mirror head tend to position the mirror further outward than might be desirable. This imposes certain limitations of the design of the mirror head which impact on its stability and ability to resist vertical loads. It also means the use of more robust materials such as die-cast components which are more expensive, and increases the amount of material required to manufacture the mirror.

The aim of the invention is to design a new style of pivot connection between a mirror head and mirror mounting bracket and to also address the problems referred to above.

SUMMARY OF THE INVENTION

In its broadest form, the invention is said to reside in a pivot assembly connecting the mirror head and mirror mounting bracket of a rear vision mirror comprising:
 a spigot,
 a plate,
 an aperture in the plate journalled to the spigot, a detent arrangement between the plate and spigot that changes from a locked position, where the plate is held with respect to the spigot, to a disengaged position by rotation of the plate with respect to the spigot, a spring acting against the detent arrangement to hold it in the locked position, the spring yielding to allow the detent arrangement to move to a disengaged position as the plate is rotated with respect to the spigot, attachment on both the spigot and plate that allows the spigot to be secured to either one of the mirror head or the mirror mounting bracket and the plate to be secured to either one of the mirror head or the mirror mounting bracket to enable the mirror head to be held, or rotated with respect to the mirror mounting bracket, and stop portion associated with the spigot and adapted to engage with either the mirror head or the mirror mounting bracket to limit rotation of the mirror head with respect to the mirror bracket.

One main advantage of the pivot assembly is its modular nature which enables a standard design of pivot assembly to be utilised between any mirror head and mounting bracket. All that is required is to standardise the area of the mirror head and mounting bracket between which the pivot assembly locates and to provide a stop arrangement or arrangements on either of the mirror head or mirror mounting bracket against which the stop means engages.

The invention also enables the pivot assembly to have a relatively small height by comparison to existing spigots. This in turn allows the glass of the mirror head to be placed further inboard and over the mirror mounting bracket which is not possible with existing spigot designs. This in turn reduces the moment arm of the mirror arm and decreases the amount of material required for manufacture of the mirror head.

There may be several means of attaching the pivot assembly to the rear vision mirror. In one instance, the pivot assembly may have a spigot plate which is spaced and parallel with the plate located and above the plate and attached to the mirror head, the spigot plate being attached to the mirror mounting bracket. Alternatively, the invention may comprise a spigot and plate where the spigot is attachable either to the mirror head or the mounting bracket. For example, in the case of a mirror head that may be supported by one or more arms to the mounting bracket, the pivot assembly can be located within the arm with a vertical pin or bolt securing the spigot with respect to the mounting bracket.

The stop portion may comprise at least one projection mounted to the spigot which when the pivot assembly is mounted between a mirror head and mounting bracket engages against the mirror head and which on rotation engages against the stop arrangement on the mirror head. The projection or projections may travel in semicircular tracks in the mirror head during rotation. The semicircular tracks terminate at each end in the stop arrangement.

Preferably there are two stop means on the spigot positioned diametrically opposite to each other about the centre of pivot of the pivot assembly so that there is a balanced force couple during rotation and when the stop means engage the stop arrangements.

It will be seen therefore that when the spigot is mounted to the mirror mounting bracket and the plate is mounted to the mirror head the stop means can limit the rotation of the mirror head thereby preventing damage to the vehicle or to the mirror.

A number of attachment means may be used to secure the pivot assembly between the mirror head and mounting bracket. These may include threaded fasteners which locate through plate elements and engage corresponding surfaces within the mirror head or mounting bracket or they may include pins or bolts which locate through the centre of the spigot to thereby secure the spigot with respect to either of the components.

Alternatively, the attachment means may comprise elements which enable quick and easy attachment of the pivot assembly to the various components. For example, tabs or other projections which can locate into the apertures and be slid into position so that the tabs hold the pivot assembly with respect to the mirror head or mounting bracket. Non-return catches can be used to hold the pivot assembly in place and to prevent disengagement of the tabs from their apertures.

A variety of detents can be used. These may incorporate indentations and projections formed within first and second relatively moving plates, or may also comprise detent elements which are held in recesses or notches between the rotating components. In both cases, the detents are held in their engaged or locked positions by a spring which can yield sufficiently to enable disengagement of the detents.

Preferably, the spring comprises a concave disc which may also have a negative spring rate as it yields during disengagement of the detent. A concave disc will have a positive spring rate which changes to a negative spring rate as it is flexed towards a flattened position. This is an inherent property of such a design, and the degree of pre-tension load can be varied by changing material, material thickness, the degree of concavity, and the number of concave spring plates which are stacked together.

The use of a spring having a negative spring rate is that maximum force is applied to the detent at its pre-loaded position and that upon force being applied to the spring, the load applied to the detent reduces so that the force or torque required to rotate the mirror head also reduces. This provides maximum holding force while at the same time reducing the force required to rotate the mirror head once this holding force has been overcome.

An advantage of the use of the spring in the form of a concave disc is the significant reduction in height requirement by comparison to conventional coil springs. This in turn means that the pivot requires less vertical space thereby enabling the mirror to be positioned more inboard and over the mirror mounting bracket than otherwise possible. Accordingly, the concave disc spring will also have application in existing mirror pivot designs.

Various components of the pivot assembly are preferably produced from stamped metal components. However, other manufacturing processes such as casting, sintering or machining may also be used.

Further, the invention may also comprise a drive means which can be used to rotate the mirror head to the parked position. In this case, the detent acts as an override clutch which enables the mirror head to rotate should the mirror be subject to a break-away force or become jammed while being rotated to a parked position. This will prevent gears used in the drive means from stripping when break away or jamming of the mirror head occurs.

In a further form the invention may be said to reside in a pivot assembly adapted to connect the mirror head and mirror mounting bracket of a rear vision mirror comprising;
　a first plate,
　an aperture in the first plate,
　a second plate,
　an aperture in the second plate that aligns with the aperture in the first plate,
　a shaft journalled through both the apertures the first and second plate rotating and separating with respect to each other about and along the axis of the shaft,
　a detent between the first and second plates that changes from a locked position, where the first and second plates are held with respect to each other, to a disengaged position by rotation of the first and second plates with respect to each other, the movement between the locked position to the disengaged position causing the first and second plates to disengage,
　a spring acting to push the first and second plates together and to resist separation of the first and second plates, and
　attachment means on both the first and second plates that allow both to be attached to either the mirror mounting bracket or the mirror head, and
　stop means associated with the shaft and adapted to engage with a stop arrangement on either the mirror head or the mirror mounting bracket to limit rotation of the mirror head with respect to the mirror bracket.

Preferably the stop means includes at least one projection mounted to the shaft which when the pivot assembly is mounted between a mirror head and mounting bracket engages against the mirror head or the mirror bracket and which on rotation engages against the stop arrangement on the mirror head or the mirror bracket.

The projection or projections may be adapted to travel in semi-circular tracks in the mirror head or the mirror mounting bracket during rotation and wherein the semicircular tracks terminate at each end in the stop arrangement.

Preferably there are two projections on the spigot being positioned diametrically opposite to each other about the centre of pivot of the pivot assembly.

In one embodiment the detent comprises a recess in one of the plates and a projection in the other of the plates, the detent locked when the projection engages within the recess. There may be a plurality of recesses and projections radially spaced around the shaft.

The recesses and projections may each comprise a pair of angled surfaces that form a v-shaped cross-section in a plane that is parallel to the axis of the shaft so that relative movement between abutting angled surfaces causes separation of the plates as they are rotated with respect to each other.

The shaft may comprises two spaced flanges between which the first and second plates locate, the spring being positioned between one of the flanges and one of the plates. The shaft is preferably tubular with the flanges located at each end of the tubular shaft.

Australian Provisional Patent Application No. PR 3955 titled "Vehicle external mirror wiring integration" discloses a pivot assembly having contacts mounted on detent surfaces for transmission of power from the base to the head. These features and other features disclosed in PR 3955 could be used with the present invention and the disclosure of PR39 55 is herewith incorporated in its entirety into this specification.

International Application No. PCT/AU00/00413 titled "Method of producing a plastic moulded part including a film covering" discloses a method of forming a moulding component comprising an outer thin film component with an adhered moulded shell. The method of that disclosure could be used to mould hollow form components that may be used with this invention (for instance for the shell of the head and base) and the disclosure of this application is incorporated herewith in its entirety.

Australian Provisional Patent Application No. PR 6683 titled "Foldable vehicle external mirror having auxiliary mirror" discloses a vehicle external mirror having an auxiliary mirror mounted to a distal side of the mirror head. The auxiliary mirror provides rear vision when the mirror head is in its folded position. This features and other features disclosed in PR 6683 could be used with the present invention and the disclosure of PR 6683 is herewith incorporated in its entirety into this specification.

Australian Provisional Patent Application Number No. PR 6204 titled "Mirror Heater" discloses an automatic heating control system and apparatus for heating the surface of a mirror to de-ice or de-fog the mirror. The heating process is initiated upon starting the vehicle engine, and is conducted in accordance with a pre-set timing sequence and in accordance with an actual measured temperature of the mirror. These features and other features disclosed in this document could be used with the present invention and the disclosure of PR 6204 is hereby incorporated in its entirety into this current specification.

It would also be possible to incorporate other components with the mirror base (mounting bracket) and or mirror head. Such components include electronic sensors such as proximity sensors to determine if the vehicle mirror is dose to an obstruction, sensors that sense external temperature and humidity, and sensors incorporated with the car security system such as motion detectors. Other various electronic equipment may be incorporated into the mirror base (mounting bracket) such as lights used to light the area around the vehicle, or lights that may be controlled from within the vehicle that enable the light to be moved so as to provide directional lighting. Speakers and microphones used to communicate to people external of the vehicle may also be incorporated as well as antennas for various apparatus such as mobile phones, GPS devices and other radio communication devices. In addition, transmitters may be incorporated into the mounting bracket which are used for controlling external objects such as garage doors or providing radio transmissions which may be used, for example, to track or locate the vehicle. Other electronic devices such as automatic toll payment systems or remote transaction systems may be incorporated into the mounting bracket to enable electronic registration of various toll payments.

Cameras may also be incorporated into the mirror base (mounting bracket) which are both forward and rearward looking which are designed to continuously record digital images and to store those images either on command or as a result of an accident or incident. Motion sensors including accelerometers can be used to determine the occurrence of an accident or incident so that images before and after the event are stored.

DESCRIPTION OF THE DRAWINGS

In order to fully understand the invention, the preferred embodiments will now be described. However, it should be realised that the invention is not to be confined or restricted to the details of these embodiments.

The embodiments will be illustrated in the accompanying figures in which;

FIGS. 3A and B show two views of a mounting plate;

FIG. 4 is a view of a spigot plate;

FIG. 5 is a view of a spigot;

FIG. 6 shows a spigot;

FIGS. 9 to 11 show schematic views of the stop means travelling in a track and the stops.

DETAILED DESCRIPTION OF THE PREFERRED EMBODIMENTS

Figure 1:
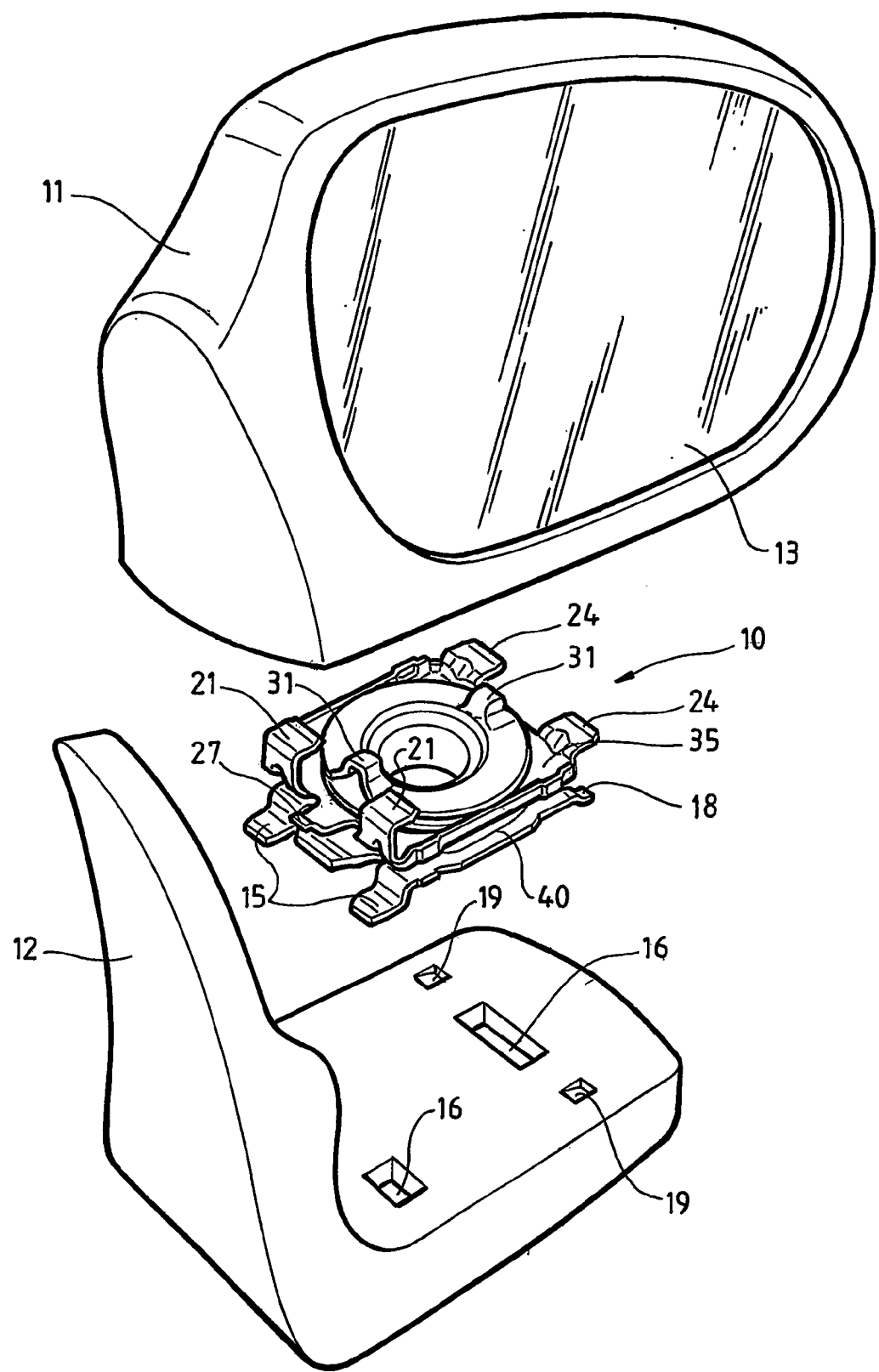
FIG. 1 is an exploded perspective view of a mirror head, mirror mounting bracket and a pivot assembly.

FIG. 1 shows a pivot assembly 10 that is used to connect a mirror head 11 with a mirror 13 to a mirror mounting or vehicle bracket 12. The vehicle bracket 12 is secured to a motor vehicle, and the pivot assembly 10 is used to connect the mirror head 11 securely in its deployed or operative position while at the same time allowing the mirror head to rotate with respect to the vehicle bracket 12. This enables the mirror head 11 to be manually moved to a parked position, or to "break away" if it is impacted or hit either while the vehicle is moving or stationary.

The pivot assembly has tabs 15 which engage in apertures 16 and locking clips 18 which engage in recesses 19 to mount the pivot assembly to the mirror bracket 12.

Figure 2:
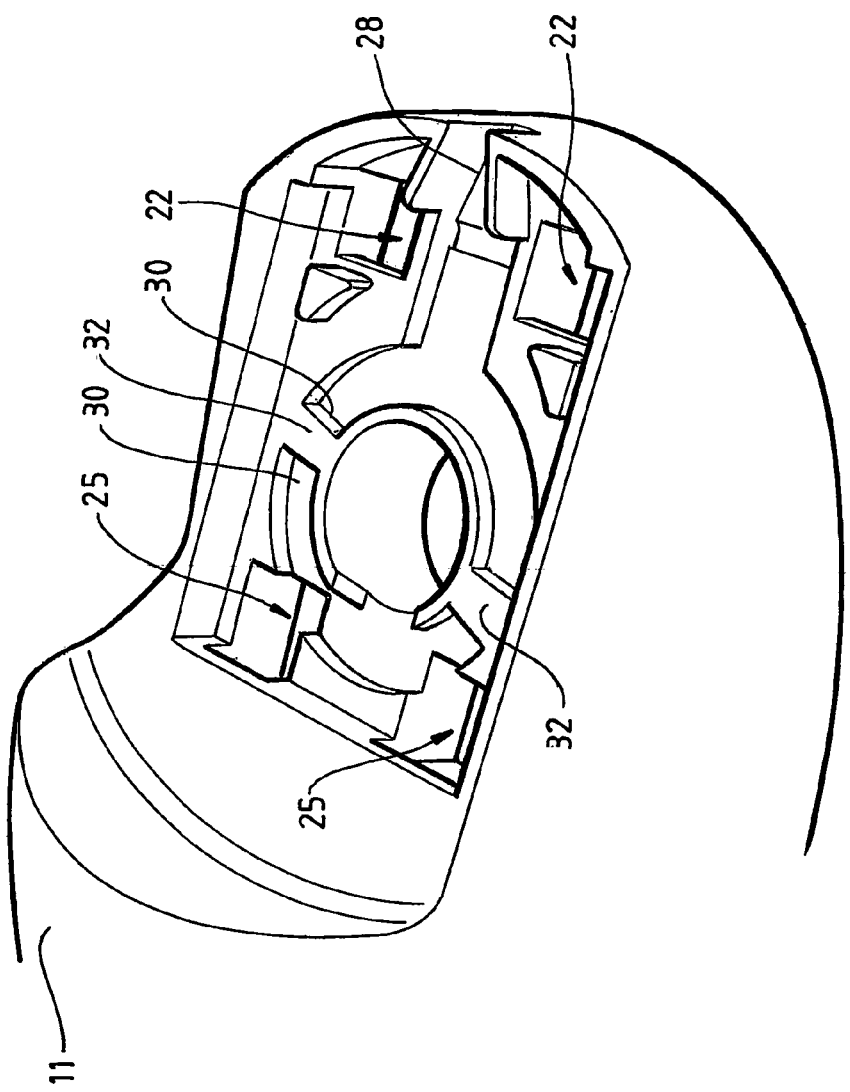
FIG. 2 is a view of the mirror head showing the region in which the pivot assembly mounts.

Referring also to FIG. 2, the pivot assembly 10 is mounted to the mirror head 11 by tabs 21 which engage in apertures 22 and tabs 24 which engage in apertures 25 and locking dip 27 which engages in recess 28.

In FIG. 2 it can also been seen the semicircular tracks 30 on the mirror head in which the stop means 31 on the pivot assembly engage. Each semicircular track 30 terminates in a stop arrangement 32 against which the stop means 31 engages to limit rotation of the mirror head with respect to the mirror bracket.

Figure 8:
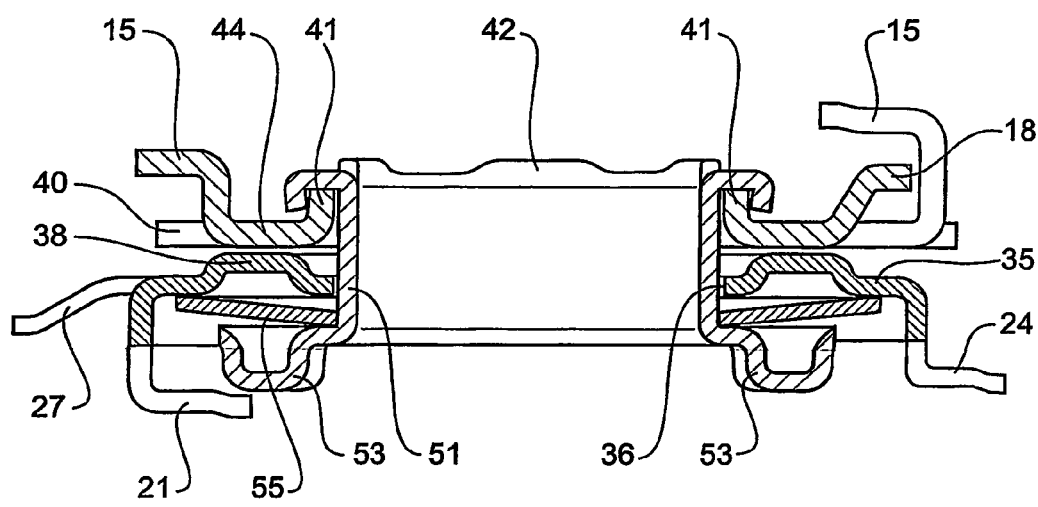
FIG. 8 shows a cross-section view of the pivot assembly.

The pivot assembly 10 is made up of a number of components as shown in FIGS. 3, to 8.

FIGS. 3A and 3B show two views of the first component, a mounting plate which is mounted to the mirror head in this embodiment when in use. The mounting plate comprises a substantially planar body 35 with an aperture 36 in the middle and surrounding the aperture a plurality of detents 38 spaced apart by recesses 39 in a circular arrangement. The mounting plate has a turned down edge 40 to give it rigidity and is mounted to the mirror head by means of tabs 21 and 24 which engage in apertures 22 and 25 respectively. Locking clip 27 engages in recess 28 in the mirror head.

FIG. 4 shows a spigot plate and this again comprises a substantially planar base 40 with an aperture 41 in its middle. The aperture is surrounded by castellations 42 as will be described with reference to the assembly of the components of the pivot assembly 10. The central aperture 41 is again surrounded by detents 43 and recesses 44 between the detents in a circular arrangement.

The spigot plate if mounted to the mirror bracket by means of tabs 15 which engage in recesses 16 and locking clips 18 which engage into recesses 19.

The spigot is shown in FIGS. 5 and 6. The spigot comprises a flange 50 and a cylindrical body 51 which in use passes through the apertures 36 and 41 to provide the pivot axle for movement of the spigot plate with respect to the mounting plate. On the flange 50 are two stop means 53.

Figure 7:
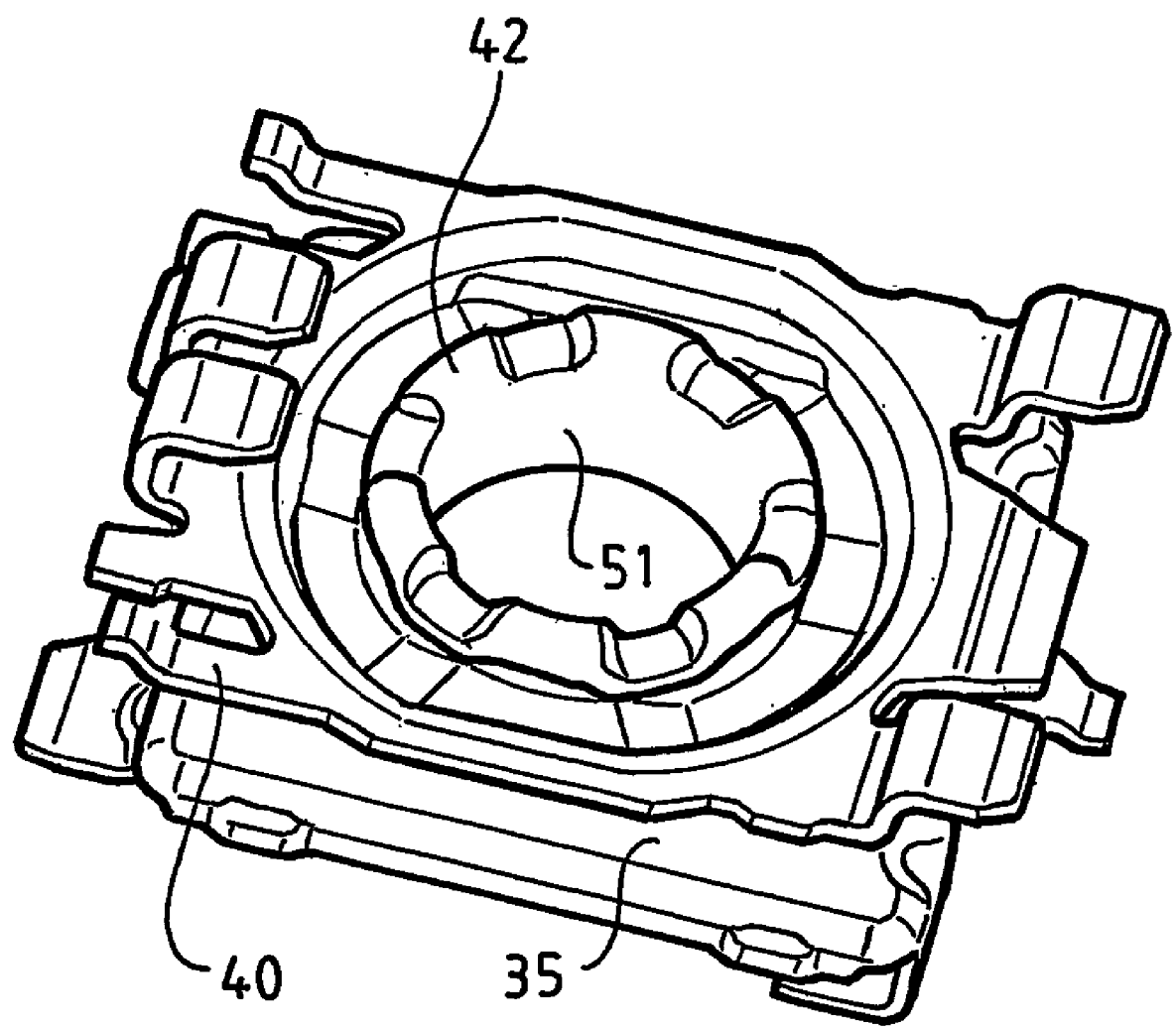
FIG. 7 is a view of a pivot assembly.

The assembly of the mounting plates, spigot plate and spigot along with the spring is shown in FIG. 7 and the cross-section shown in FIG. 8.

To assemble the pivot assembly, the spring 55 which is a disc spring is mounted to the spigot and then the spigot body 51 is passed through the aperture 36 in the plate 35 and then the aperture 41 in the plate 40 and then the end of the spigot body 51 is folded over the castellations 42 so that the spigot is firmly crimped to the spigot plate 40 and moves with it. At the same time a certain pre-load is provided on the spring 55 and the detent 38 on the mounting plate engages with a recess 44 on the spigot plate and the detent 43 on the spigot plate fits into recess 39 on the mounting plate.

Upon rotation of the mounting plate with respect to the spigot plate the detents rise up on each other and compress the spring 55. The respective circumferential lengths of the detents and recesses may be varied to vary the angle through which the mirror can turn.

Figure 11:
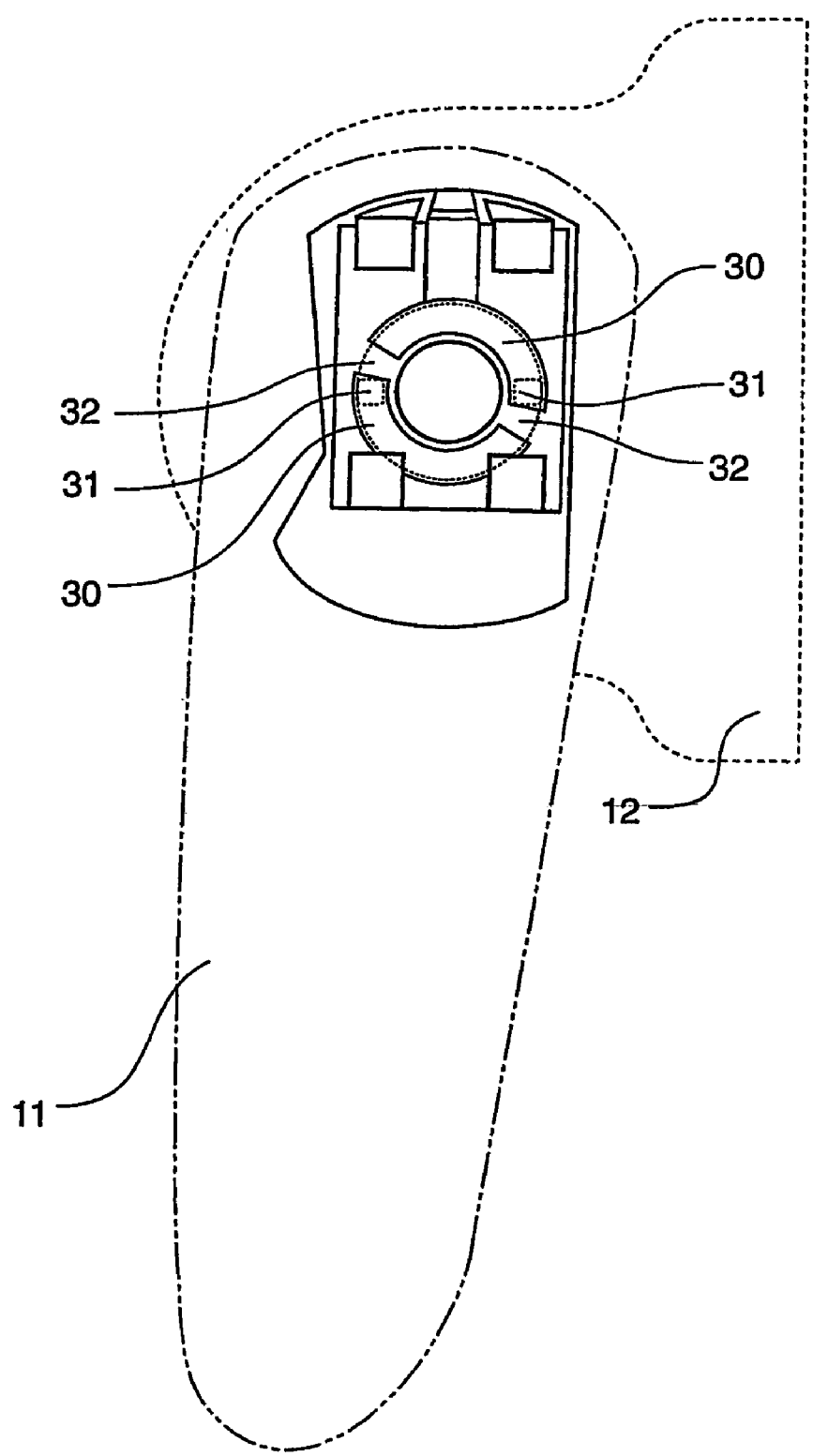

FIGS. 9 to 11 show a schematic view of the action of the stop means and stops during movement of the mirror head 11 with respect to the mirror base 12.

As will be appreciated with respect to FIG. 8 the spigot is crimped to the spigot plate 40 so that the stop means 53 are fixed with respect to the spigot plate 40 and move with respect to the mounting plate 35. The mounting plate 35 is mounted to the mirror head and the spigot plate 40 is mounted to the mirror bracket. Hence, the stop means are fixed in position with respect to the mirror bracket and move in the tracks 30 in the mirror head during rotation of the mirror.

As can be seen in FIG. 9 when the mirror is in its normal position, the stop means 31 are positioned in the track 30 in such a manner so that the mirror head 11 can move in either direction with respect to the mirror bracket 12.

As can be seen in FIG. 10, the mirror has been moved back and in this position the stop means 31 are engaged against the stops 32 at one end of the semicircular tracks 30.

As can be seen in FIG. 11 when the mirror is in its forward folded position, the stop means 31 are at the other end of the tracks 30 and engaged against the stops 32 on the other side from that of FIG. 10.

By the use of two stop means, an even force couple is obtained during movement of the stop means in the semi-circular tracks so that twisting out the axis of rotation of the mirror does not occur.

Throughout this specification, various indications have been given as to the scope with the invention, but the invention is not limited to any one of these, but may reside in two or more of these combined together. The examples are given for illustration only and not for limitation.

The invention claimed is:

1. A pivot assembly adapted to connect a mirror head and a mirror mounting bracket of a rear vision mirror assembly, the pivot assembly comprising;
   a spigot,
   a plate,
   an aperture in the plate journalled to the spigot,
   a detent arrangement between the plate and spigot that changes from a locked position, where the plate is held with respect to the spigot, to a disengaged position by rotation of the plate with respect to the spigot,
   a spring acting against the detent arrangement to hold it in the locked position, the spring yielding to allow the detent arrangement to move to a disengaged position as the plate is rotated with respect to the spigot,
   attachment arrangements on both the spigot and plate that allow the spigot to be secured to either one of the mirror head or the mirror mounting bracket and the plate to be secured to either one of the mirror head or the mirror mounting bracket to enable the mirror head to be held, or rotated with respect to the mirror mounting bracket, and
   a stop portion associated with the spigot and adapted to engage with a stop arrangement on either the mirror head or the mirror mounting bracket to limit rotation of the mirror head with respect to the mirror mounting bracket.

2. A pivot assembly as in claim 1 wherein the spigot includes a spigot plate which is spaced from and parallel with the plate.

3. A pivot assembly as in claim 1 wherein the stop portion includes at least one projection mounted to the spigot which when the pivot assembly is mounted between a mirror head and mounting bracket engages against the mirror head or the mirror bracket and which on rotation engages against the stop arrangement on the mirror head or the mirror bracket.

4. A pivot assembly in claim 3 wherein the projection or projections are adapted to travel in semi-circular tracks in the mirror head or the mirror mounting bracket during rotation and wherein the semicircular tracks terminate at each end in the stop arrangement.

5. A pivot assembly as in claim 3 wherein there are two projections on the spigot being positioned diametrically opposite to each other about the centre of pivot of the pivot assembly.

6. A pivot assembly according to claim 1 wherein the detent assembly comprises a recess on the plates and a projection associated with the spigot, the detent assembly being locked when the projection engages within the recess.

7. A pivot assembly according to claim 6 further comprising a plurality of recesses and projections.

8. A pivot assembly according to claim 6 wherein the recesses and projections each comprise a pair of angled surfaces that form a v-shaped cross-section in a plane that is parallel to the axis of the spigot so that relative movement between abutting angled surfaces causes separation of the plate and the spigot as they are rotated with respect to each other.

9. A pivot assembly according to claim 2 wherein the spigot plate is attached to the mirror mounting bracket and the plate is attached to the mirror head.

10. A pivot assembly according to claim 9 wherein the attachment arrangement comprises a plurality of threaded fasteners securing the plates to the mirror head and mirror mounting bracket.

11. A pivot assembly according to claim 9 wherein the attachment arrangement further includes a plurality of tabs projecting from the spigot plate and the plate, and the mirror mounting bracket and the mirror head further comprise a plurality of slots positioned so that each of the tabs locates within a slot to thereby position the pivot assembly with respect to the mirror head and mirror mounting bracket.

12. A pivot assembly according to claim 11 wherein the tabs are engaged into the slots by inserting the tabs into the opening of the slot and moving the pivot assembly in a direction that is substantially transverse to the axis of the spigot to fully engage the tabs.

13. A pivot assembly according to claim 12 further comprising at least one locking tab on each of the spigot plate and plate and a recess in the mirror mounting bracket and mirror head that the locking tab engage into once the pivot assembly has been moved into position.

14. A pivot assembly according to claim 13 wherein each the locking tab is formed by a cut extending along the edge of each of the spigot plate and plate, the tab deflected away from the plane of the plates so that the end of the tab is spaced from the plane of the plates.

15. A pivot assembly according to claim 1 wherein the spring comprises a concave disc spring.

16. A pivot assembly according to claim 15 wherein the concave disc spring comprises a negative spring rate as it yields during disengagement of the detent.

17. A pivot assembly according to claim 2 wherein the spigot plate and the plate are produced from stamped metal components.

18. A pivot assembly adapted to connect the mirror head and mirror mounting bracket of a rear vision mirror comprising;
   a first plate,
   an aperture in the first plate,
   a second plate,
   an aperture in the second plate that aligns with the aperture in the first plate,
   a shaft journalled through both the apertures the first and second plate rotating and separating with respect to each other about and along the axis of the shaft,
   a detent between the first and second plates that changes from a locked position, where the first and second plates are held with respect to each other, to a disengaged position by rotation of the first and second plates with respect to each other, the movement between the locked position to the disengaged position causing the first and second plates to disengage,
   a spring acting to push the first and second plates together and to resist separation of the first and second plates, and
   attachment means on both the first and second plates that allow both to be attached to either the mirror mounting bracket or the mirror head, and
   a stop means associated with the shaft and adapted to engage with a stop arrangement on either the mirror head or the mirror mounting bracket to limit rotation of the mirror head with respect to the mirror mounting bracket.

19. A pivot assembly as in claim 18 wherein the stop means includes at least one projection mounted to the shaft which when the pivot assembly is mounted between a mirror head and mounting bracket engages against the mirror head or the mirror bracket and which on rotation engages against the stop arrangement on the mirror head or the mirror bracket.

20. A pivot assembly as in claim 19 wherein the projection or projections are adapted to travel in semi-circular tracks in the mirror head or the mirror mounting bracket during rotation and wherein the semicircular tracks terminate at each end in the stop arrangement.

21. A pivot assembly as in claim 19 wherein there are two projections on the spigot being positioned diametrically opposite to each other about the centre of pivot of the pivot assembly.

22. A pivot assembly according to claim 18 wherein the detent comprises a recess in one of the plates and a projection in the other of the plates, the detent locked when the projection engages within the recess.

23. A pivot assembly according to claim 22 further comprising a plurality of recesses and projections radially spaced around the shaft.

24. A pivot assembly according to claim 22 wherein the recesses and projections each comprise a pair of angled surfaces that form a v-shaped cross-section in a plane that is parallel to the axis of the shaft so that relative movement between abutting angled surfaces causes separation of the plates as they are rotated with respect to each other.

25. A pivot assembly according to claim 18 wherein the shaft further comprises two spaced flanges between which the first and second plates locate, the spring being positioned between one of the flanges and one of the plates.

26. A pivot assembly according to claim 25 wherein the shaft is tubular with the flanges located at each end of the tubular shaft.

27. A pivot assembly adapted to connect a mirror head and a mirror mounting bracket of a rear vision mirror assembly, the pivot assembly comprising;
   a spigot,
   a plate having an aperture journaling said plate to the spigot,
   a spigot plate which is spaced from and parallel with the plate, wherein the spigot plate is attached to the mirror mounting bracket and the plate is attached to the mirror head;
   a detent arrangement between the plate and spigot that changes from a locked position, where the plate is held with respect to the spigot, to a disengaged position by rotation of the plate with respect to the spigot,
   a spring acting against the detent arrangement to hold it in the locked position, the spring yielding to allow the detent arrangement to move to a disengaged position as the plate is rotated with respect to the spigot,
   attachment arrangements on both the spigot and plate that allow the spigot to be secured to either one of the mirror head or the mirror mounting bracket and the plate to be secured to either one of the mirror head or the mirror mounting bracket to enable the mirror head to be held, or rotated with respect to the mirror mounting bracket,
   wherein the attachment arrangement further includes a plurality of tabs projecting from the spigot plate and the plate, and the mirror mounting bracket and the mirror head further comprise a plurality of slots positioned so that each of the tabs locates within a slot to position the pivot assembly with respect to the mirror head and mirror mounting bracket, said plurality of tabs being engaged into the slots by inserting the tabs into the opening of the slot and moving the pivot assembly in a direction that is substantially transverse to the axis of the spigot to fully engage the tabs; and
   a stop portion associated with the spigot and adapted to engage with a stop arrangement on either the mirror head or the mirror mounting bracket to limit rotation of the mirror head with respect to the mirror mounting bracket.

28. A pivot assembly according to claim 27 further comprising at least one locking tab on each of the spigot plate and plate and a recess in the mirror mounting bracket and mirror head that the locking tab engage into once the pivot assembly has been moved into position.

29. A pivot assembly according to claim 28 wherein each the locking tab is formed by a cut extending along the edge of each of the spigot plate and plate, the tab deflected away from the plane of the plates so that the end of the tab is spaced from the plane of the plates.

* * * * *